(12) United States Patent
Kamay et al.

(10) Patent No.: US 8,607,082 B2
(45) Date of Patent: *Dec. 10, 2013

(54) MECHANISM FOR MANAGING POWER IN A VIRTUAL MACHINE SYSTEM

(75) Inventors: Yaniv Kamay, Modí (IL); Shahar Frank, Ramat Hasharon (IL)

(73) Assignee: Red Hat Israel, Ltd., Raanana (IL)

( * ) Notice: Subject to any disclaimer, the term of this patent is extended or adjusted under 35 U.S.C. 154(b) by 517 days.

This patent is subject to a terminal disclaimer.

(21) Appl. No.: 12/551,479

(22) Filed: Aug. 31, 2009

(65) Prior Publication Data

US 2011/0055602 A1    Mar. 3, 2011

(51) Int. Cl.
G06F 1/32 (2006.01)
G06F 1/26 (2006.01)
G06F 1/00 (2006.01)
G06F 9/445 (2006.01)

(52) U.S. Cl.
USPC ............... 713/320; 713/300; 713/323; 718/1

(58) Field of Classification Search
USPC ........................ 713/300, 320, 323; 718/1
See application file for complete search history.

(56) References Cited

U.S. PATENT DOCUMENTS

| | | | |
|---|---|---|---|
| 7,137,016 B2 * | 11/2006 | Nalawadi et al. | 713/300 |
| 7,543,166 B2 | 6/2009 | Zimmer et al. | |
| 7,739,527 B2 * | 6/2010 | Rothman et al. | 713/320 |
| 2002/0099753 A1 * | 7/2002 | Hardin et al. | 709/1 |
| 2005/0268078 A1 * | 12/2005 | Zimmer et al. | 713/1 |
| 2007/0130305 A1 * | 6/2007 | Piper et al. | 709/223 |
| 2009/0293056 A1 | 11/2009 | Ferris | |
| 2009/0300381 A1 * | 12/2009 | Chen et al. | 713/310 |
| 2010/0115315 A1 * | 5/2010 | Davis et al. | 713/323 |
| 2010/0192149 A1 * | 7/2010 | Lathrop et al. | 718/1 |
| 2010/0199062 A1 | 8/2010 | Sancho-Dominguez et al. | |
| 2010/0218014 A1 | 8/2010 | Bozek et al. | |
| 2010/0218183 A1 | 8/2010 | Wang et al. | |
| 2010/0306560 A1 | 12/2010 | Bozek et al. | |
| 2010/0325197 A1 * | 12/2010 | Heim | 709/203 |
| 2011/0055602 A1 | 3/2011 | Kamay et al. | |
| 2011/0191610 A1 * | 8/2011 | Agarwal et al. | 713/310 |

OTHER PUBLICATIONS

USPTO, Notice of Allowance for U.S. Appl. No. 12/551,460, mailed on Jan. 17, 2013.*
Qumranet, Solid ICE™, Connection Broker, Apr. 2008, 7 pages.
Qumranet, KVM-Kernel-based Virtualization Machine, White Paper, 2006, 5 pages.
Qumranet, Solid ICE™, Overview, Apr. 2008, 15 pages.
Qumranet, Solid ICE™, Provisioning Manager, Apr. 2008, 5 pages.
Qumranet, Solid ICE™, Virtual Desktop Server (VDS), Apr. 2008, 6 pages.

* cited by examiner

*Primary Examiner* — Ji H Bae
(74) *Attorney, Agent, or Firm* — Lowenstein Sandler LLP

(57) ABSTRACT

A mechanism for managing power in a virtual machine system is disclosed. A method for a host-based power management system may include monitoring a plurality of VMs in a VM system to detect user activity associated with each of the plurality of VMs, identifying a VM of the plurality of VMs that is inactive based on the user activity associated with the VM, and applying a power reduction policy to the VM.

20 Claims, 4 Drawing Sheets

MECHANISM FOR MANAGING POWER IN A VIRTUAL MACHINE SYSTEM

TECHNICAL FIELD

The embodiments of the invention relate generally to virtual machine systems and, more specifically, relate to a mechanism for managing power in a virtual machine system.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (guest OS) and software applications (processes). Typically, a virtual machine manager (VMM) manages allocation and virtualization of computer resources and performs context switching, as may be necessary, to cycle between various VMs.

A host machine (e.g., computer or server) is typically enabled to simultaneously run multiple VMs, where each VM may be used by a remote client. The host machine allocates a certain amount of the host's resources to each of the VMs. Each VM is then able to use the allocated resources to execute applications, including guest operating systems. The VMM virtualizes the underlying hardware of the host machine or emulates hardware devices, making the use of the VM transparent to the guest operating system or the remote client that uses the VM.

Recently, solutions providing centralized hosting for VMs that run (virtual) desktops have been developed. Such solutions consist of centralized servers that are partitioned into multiple VMs that host the virtual desktops, thereby providing a desktop for each user. The centralized hosting provides the manageability of sever-based computing, while the dedicated environment provides the flexibility and compatibility with applications that a desktop enables. In general, VMs therefore enable remote access to a host or server computer by a remote client computer, which mimics or reconstructs the events taking place on the host computer.

However, one problem that arises with the centralized hosting solution for VMs is excessive power consumption. Currently, centralized data centers attempt to save power in a non-virtualization environment by using several power management mechanisms and policies to reduce power. For example, a data center may selectively switch off computing machines, or part of the computing machines, so that the data center is consuming less power overall. Some examples of existing power management mechanisms and/or policies include shutting off an operating system (OS), placing the OS in a low power consumption mode, placing the OS in a hibernation mode, placing the OS in a suspend mode, selectively shutting down a system display, system networking component, reducing a frequency of an operating CPU, and so on.

However, with a virtualized system, these currently-existing power management mechanisms and policies are not effective in the VM hosting environment. The current power management mechanisms and policies cannot be used because, from the host view, each VM is a component that is always working. It becomes practically impossible to use any prior art power management method to reduce power, as the host needs computing power for the working VMs.

In addition, another problem associated with currently-existing power management mechanisms as applied to a VM hosting environment is that individual users of VMs in the VM hosting environment may maintain control over the power management mechanisms and policies. For example, a user of a VM is able to set time limits for when the system will implement a screen saver, go into hibernate mode, shut off, and so on. In such a case, a user of a VM can effectively override the power management mechanisms and policies by setting unrealistic limits for power saving policies to be implemented, thereby nullifying their effects. Therefore, a mechanism to manage power in a VM system that is beyond the scope of end user influence would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
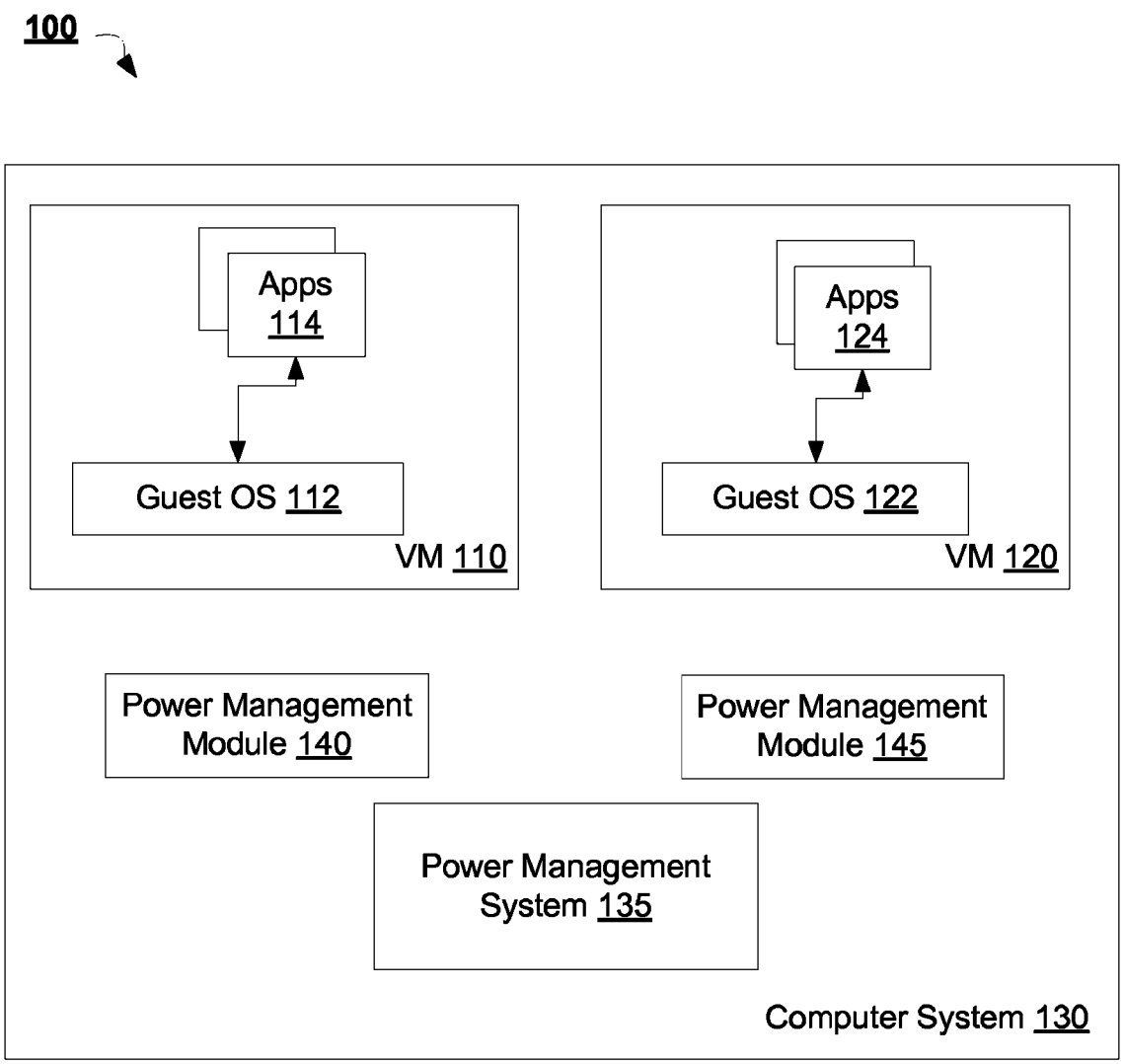
FIG. 1 is a block diagram of a virtualization system implementing power management according to one embodiment of the invention.

Embodiments of the invention provide for a mechanism for managing power in a virtual machine system. In one embodiment, a method of managing power in a virtual machine system by a host-based power management system includes monitoring a plurality of VMs in a VM system to detect user activity associated with each of the plurality of VMs, identifying a VM of the plurality of VMs that is inactive based on the user activity associated with the VM, and applying a power reduction policy to the VM.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for managing power in a virtual machine system. Embodiments of the invention manage power in a virtual machine system hosting multiple virtual machines (VMs) by utilizing a power management system external to the VMs. When inactivity by a user in a particular VM is detected, the power management system implements one or more power reduction policies to the VM. As the power management system is external to the VM, it is outside of the scope of a user of the VM's control. Embodiments of the power management system solve three problems: (1) reducing power consumption of a virtual machine system, (2) protecting a display of a VM client, and (3) reducing power consumption of a remote VM client.

FIG. 1 is a block diagram of a computer system 100 that manages power consumption of a VM system according to embodiments of the invention. As shown in FIG. 1, two VMs 110 and 120 respectively run guest OS 112 and 122. Guest OS 112 executes applications 114 and guest OS 122 runs applications 124.

The guest OSes 112, 122 and the associated VMs are controlled by a software layer that runs directly on a hardware platform of the computer system 110 and virtualizes the hardware platform's physical resources. This software layer may be referred to as a virtual machine monitor (VMM), a hypervisor, a host OS or a kernel-based virtual machine (KVM). A guest OS may be of the same or different type with respect to the host OS. For example, a guest OS may be a Windows operating system from Microsoft and a host OS may be a Linux operating system available from Red Hat. In addition, the guest OSes 112 and 122 can be of the same or different types.

The hardware platform of the computer system 130 may include a central processing unit (CPU), a system memory, a storage disk, a network interface card (NIC), a display adapter, and so on. The interface exported to the VMs 110 and 120 is the same as the interface of each of the hardware's resources would appear in a physical desktop computer.

In one embodiment, VMs 110 and 120 are each associated with a power management module 140 and 145, respectively. Power management modules 140 and 145 are coupled to a global power management system 130. The power management system 130 and the modules 140, 145 may run on top of the VMM, or be part of the VMM or a hardware emulation layer. Power management module 140, 145 monitors a respective VM 110, 120, determines whether VM 110, 120 is inactive, and notifies the power management system 135 about an inactive VM. In response to identifying an inactive VM 110, 120, power management system 135 selects a power reduction policy for the inactive VM 110, 120, and enforces this power reduction policy. In certain embodiments, at least some procedures for enforcing the power reduction policy are performed by the power management module 140, 145 independently or under control of the power management system 135.

Embodiments of the invention prevent a user of the VM 110, 120 from modifying power reduction settings for the VM 120, 120 because the user is unable to access the power management system 135. In this way, the monitoring of activity, and therefore power consumption, of each VM 110, 120 is performed by a host of the VM 110, 120, rather than the VM 110, 120 itself.

Examples of power reduction policies include running a screen saver, reducing priority, swapping VMs, hibernation, suspension, standby, shut off, and so on. One skilled in the art will appreciate that there are a wide variety of power reduction policies possible to implement in embodiments of the invention.

In another embodiment, an Advanced Configuration and Power Interface (ACPI) mechanism may be utilized to trigger implementation of power reduction policies by the power management system 135. The ACPI mechanism is used to signal when power management is necessary. It is part of the BIOS of the OS system. For example, in order to hibernate a system, the OS triggers an ACPI function to switch the system to the hibernation state. Embodiments of the invention may catch an ACPI event triggered by the guest OS 112, 122 to implement a power reduction policy for the VM 110, 120. The ACPI mechanism is emulated as part of the VM 110, 120, so that each individual VM is capable of throwing an ACPI event.

Figure 2:
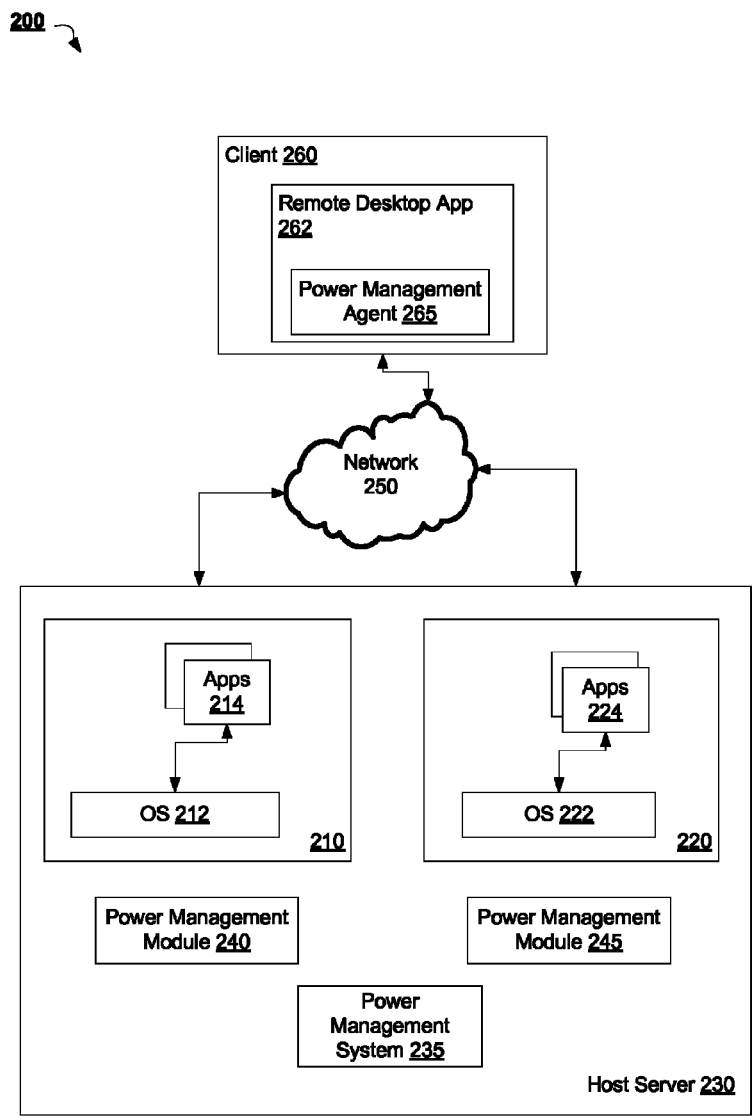
FIG. 2 is a block diagram of a virtualization system implementing power management according to another embodiment of the invention.

FIG. 2 is a block diagram illustrating a virtualization system 200 that manages power consumption in a VM system according to another embodiment of the invention. The virtualization system 200 includes one or more clients 260 coupled to a host server 230 via a network 250. Network 250 may be a local area network (LAN) or a wide area network (WAN) and may be a combination of one or more networks. The server 230 hosts VMs 210 and 220 that respectively run guest OS 212 and guest OS 222. Guest OS 212 executes applications 214 and guest OS 222 runs applications 224. The guest OSes 212, 222 and the associated VMs are controlled by a software layer that runs directly on a hardware platform of the server 230 and virtualizes the hardware platform's physical resources. This software layer may be referred to as a VMM, a hypervisor, a host OS or a KVM.

In one embodiment, each virtual machine 210, 220 hosts or maintains a desktop environment providing virtual desktops for remote clients including client 260. In some embodiments, client 260 may be a thin client with sufficient resources to enable a user to interact with a virtual desktop provided by VM 210, 220. A virtual desktop can represent an output (e.g., an image to be displayed) generated by a desktop application running within virtual machine 210 or 220. Graphics data associated with the virtual desktop can be captured and transmitted to a client such as client 260, where the virtual desktop may be rendered by a rendering agent and presented by a client application.

In one embodiment, the sever 230 includes power management modules 240, 245 associated with respective VMs 210, 220 to monitor VMs 210, 220, determine when VM 210, 220 becomes inactive, and notify a global power management system 235. In response to identifying an inactive VM 210, 220, the power management system 235 identifies a power reduction policy for the inactive VM 210, 220, and enforces this power reduction policy. In certain embodiments, at least some procedures for enforcing the power reduction policy are performed by the power management module 140, 145 independently or under control of the power management system 135.

In some embodiments, client 260 includes a remote desktop application 262 to provide a remote connection protocol built for virtual environments that enables the user to view and interact with VMs 210, 220 via a remote computing system. Remote desktop application 262 may also include a client-side power management agent 265 that operates in tandem with the host-side power management system 235 and modules 240, 245 running on server 230. It should be noted, however, that the presence of the power management agent 265 on the client is not necessary for the embodiments of the present invention. In addition, the client-side power management agent 265 can be part of a different module or be an independent module executing on client 260.

The client-side power reduction agent 265 may assist in the power management module responsibilities, such as gathering user activity associated with a VM, running a screen saver on the client side, and communicating with the host-side power management modules 240, 245 to implement power reduction policies for the VM. In one embodiment, client-side power management agent 265 may be utilized along with the host-side power management modules 240, 245 to activate local policies on the client device. For example, instead of the host-side power management module 240, 245 applying a standby condition to the VM 210, 220, the host-side power management module 240, 245 may receive a request from the power management system 235 to signal the client-side power management agent 265 to run the screen saver on its end. It is envisioned that client-side power management agent 265 may assist host-side power management system 235 in implementing other power reduction policies for VMs 210, 220 and embodiments of the invention are not limited solely to the above implementation.

In one embodiment, an ACPI mechanism is used at the client 260 to switch the client physical machine to a power saving mode. The client 260 may then be switched out from the power saving mode using a mechanism such as "wake-on-LAN" (e.g., waking the client up via a special packet received on the LAN).

In some embodiments, the client 260 may include multiple display monitors, each associated with a particular VM. In such a case, the power management module 240, 245, and the client-side power management agent 265 should differentiate between the displays and associated VMs and only control the display that the inactive VM is currently associated with. If there is more than one VM associated with a display, then the power management module 240, 245, and the power management agent 265 may implement power reduction policies to the entire monitor in the case where all of the VMs associated with the display are inactive.

Figure 3:
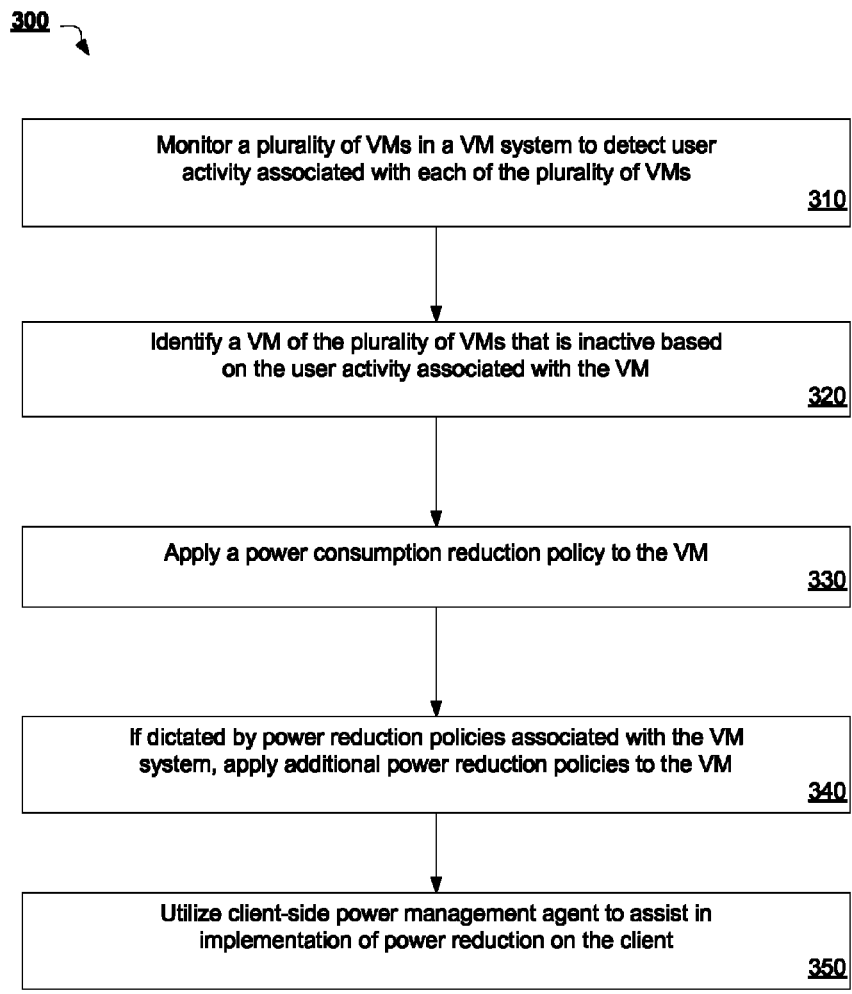
FIG. 3 is a flow diagram illustrating a method for managing power in a virtual machine system according to an embodiment of the invention.

FIG. 3 is a flow diagram illustrating a method 300 for managing power consumption in a virtual system according to an embodiment of the invention. Method 300 may be performed by processing logic that may comprise hardware (e.g., circuitry, dedicated logic, programmable logic, microcode, etc.), software (such as instructions run on a processing device), or a combination thereof. In one embodiment, method 300 is performed by virtualization system 100 of FIG. 1. In another embodiment, method 300 may be performed by virtualization system 200 of FIG. 2.

Method 300 begins at block 310 where power management modules monitor a plurality of VMs in a VM system. The power management modules monitor respective VMs with the aim of detecting user activity associated with the respective VMs. In one embodiment, the power management module is external to the VM and is hosted by a VMM communicably coupled to the VMs. The user activity may consist of mouse and keyboard activity associated with a user of the VM. In another embodiment, an ACPI mechanism is emulated for each VM to enable each individual VM to throw an ACPI event when there is a certain change in the user activity associated with the VM. A power management module can be configured to detect such ACPI events.

Then, at block 320, an inactive VM is identified by the power management module and reported to the power management system. The VM is determined to be inactive by the power management module based on its monitored user activity. In one embodiment, standard activity settings (e.g., time intervals of inactivity) within the power management module provide the basis to make an inactivity determination for a VM. At block 330, a power reduction policy is selected and enforced by the power management system for the VM. In certain embodiments, at least some procedures for enforcing the power reduction policy are performed by the respective power management module independently or under control of the power management system. The power management system may select a power reduction policy based on standard power reduction settings of the power management system. For example, the standard power reduction settings may require that the VM will go into a standby condition after 15 minutes of user inactivity.

As discussed above, the power reduction policy may consist of one or more of a variety of power-saving policies, including, for example, running a screen saver, reducing priority of a VM, swapping the VM with another VM, hibernation, suspension, standby, and shut off. Other power-saving policies may also be implemented and embodiments of the invention are not solely limited to the above-mentioned policies.

At block 340, additional power reduction policies may be applied to the VM in addition to the initially applied power reduction policy. Embodiments of the invention include the possibility of multiple power reduction policies being applied by the power management module to a single VM based on an elapsed period of inactivity of the VM. For example, initially a priority reduction can be applied to an inactive VM, and then after a preset period of time passes, a standby condition may be applied to the VM.

Next, in one embodiment, in which VMs are associated with a remote client, control of one or more of the power reduction policies applied to the VM by the power management module may be passed to a client-side power management agent (block 350). In this way, power consumption related to the VM's implemented power reduction policy on the host side is offloaded to the client side.

Figure 4:
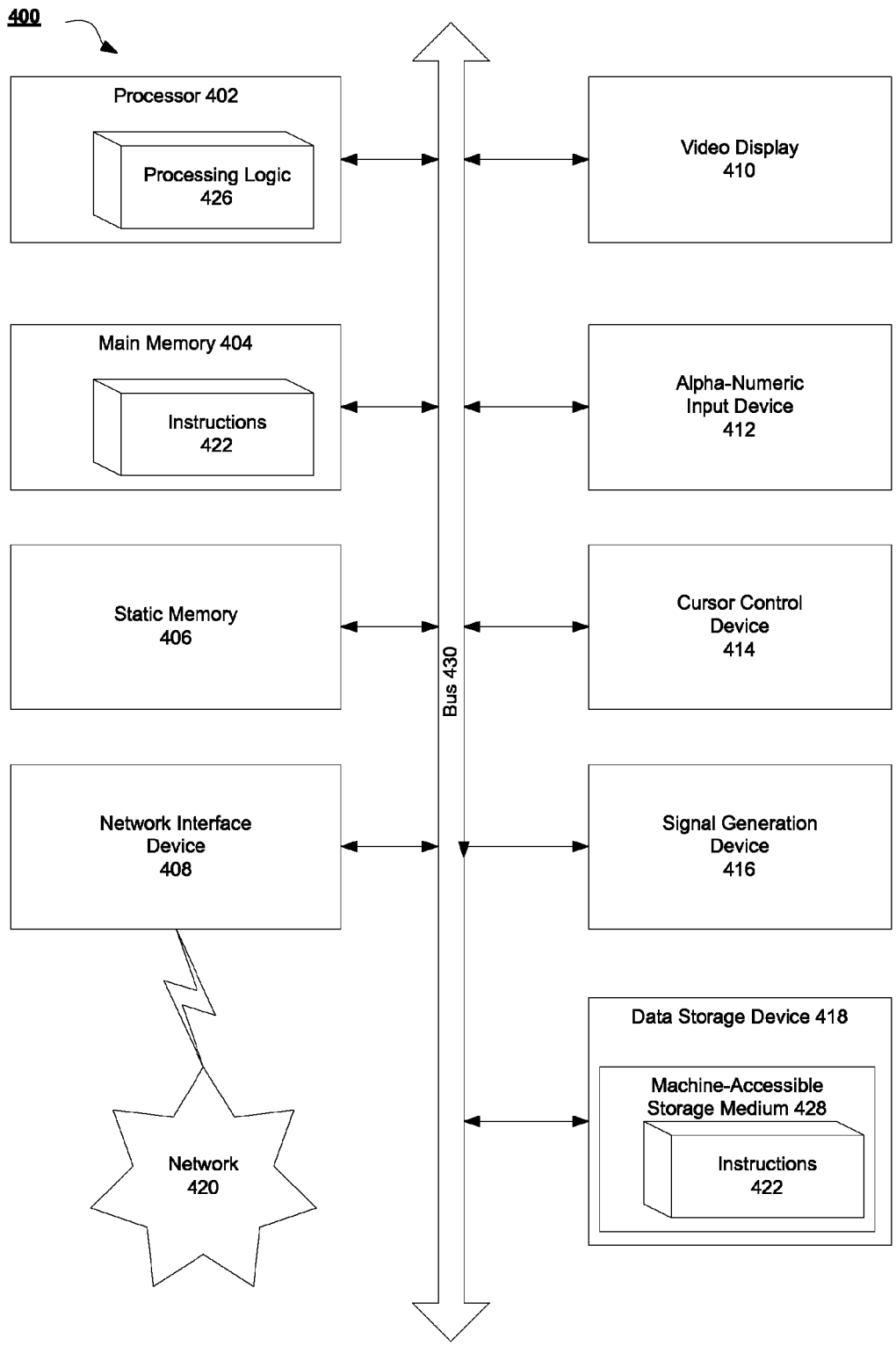
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an internet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 428 on which is stored one or more set of instructions (e.g., software 422) embodying any one or more of the methodologies of functions described herein. The software 422 may also reside, completely or at least partially, within the main memory 404 and/or within the processing device 402 during execution thereof by the computer system 400; the main memory 404 and the processing device 402 also constituting machine-accessible storage media. The software 422 may further be transmitted or received over a network 420 via the network interface device 408.

The machine-readable storage medium 428 may also be used to store instructions to manage power consumption in a VM system as described in embodiments of the invention and implemented by virtualization system 100 of FIG. 1 or virtualization system 200 of FIG. 2, and/or a software library containing methods that call the above applications. While the machine-accessible storage medium 428 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A computer-implemented method comprising:
executing, by a hypervisor of a host computer system, a plurality of VM power management modules each dedicated to a virtual machine (VM) of a plurality of VMs hosted by the host computer system, wherein each VM power management module of the plurality of VM power management modules is executed external to its associated VM by the hypervisor;
for each VM of the plurality of VMs:
monitoring, by the VM power management module associated with the VM, the VM to detect user activity associated with the VM;
identifying, by the VM power management module associated with the VM, when the VM is inactive based on the user activity associated with the VM; and
when the VM is identified as inactive, notifying, by the VM power management module, a power management system of the host computer system of the inactivity of the VM;
wherein the power management system applies, in response to receiving a notification of inactivity of one of the plurality of VMs, a power reduction policy to the VM identified as inactive.

2. The method of claim 1, further comprising, for each VM of the plurality of VMs, applying more than one power reduction policy to the VM based on power reduction settings of the VM power management module.

3. The method of claim 1, wherein the power reduction policy comprises at least one of priority reduction, swapping the VM with another VM, hibernation, suspension, standby, or shut off.

4. The method of claim 1, wherein identifying when the VM that is inactive further comprises determining whether there is no user inactivity for a time interval specified by activity settings of the VM power management module.

5. The method of claim 1, wherein a client-side power management agent works in tandem with the VM power management system of the host computer system to apply the power reduction policy to the VM, the client-side power management agent located on a client that displays a desktop of the VM to an end user of the VM.

6. The method of claim 5, further comprising passing control of the power reduction policy selected by the VM power management module to the client-side power management agent.

7. The method of claim 1, wherein an end user of the VM is unable to modify settings associated with the power reduction policy.

8. The method of claim 1, wherein an Advanced Configuration and Power Interface (ACPI) mechanism associated with the VM provides an indication to the VM power management module that the VM is inactive.

9. A computing device, comprising:
a memory;
a processing device communicably coupled to the memory;
a plurality of virtual machines (VMs) executable from the memory by the processing device; and
a power management system communicably coupled to the plurality of VMs, the power management system comprising instructions stored in the memory and executed by the processing device to:
execute a plurality of VM power management modules each dedicated to a VM of the plurality of VMs, wherein each VM power management module of the plurality of VM power management modules is executed external to its associated VM;
for each VM of the plurality of VMs:
cause to be monitored by the VM power management module associated with the VM, the monitoring to detect user activity associated with the VM;
receive, from the VM power management module associated with the VM, an alert when the VM is inactive based on the user activity associated with the VM; and
in response to the alert of inactivity, apply a power reduction policy to the VM.

10. The computing device of claim 9, wherein the power management system is further to, for each VM of the plurality of VMs:
instruct the VM power management module associated with the VM to apply the power reduction policy to the VM; and
apply additional power reduction policy to the VM based on power reduction settings of the power management system.

11. The computing device of claim 9, wherein the power reduction policy comprises at least one of a screen saver, priority reduction, swapping the VM with another VM, hibernation, suspension, standby, or shut off.

12. The computing device of claim 9, wherein an end user of the VM is unable to modify settings associated with the power reduction policy.

13. The computing device of claim 9, further comprising a client-side power management agent executable on a client device remotely coupled to the VM and that displays a desktop of the VM to an end user of the VM, the client-side power management agent to work in tandem with the power management system to apply the power reduction policy to the VM.

14. The computing device of claim 13, wherein the power management system further to pass control of the power reduction policy implemented for the VM to the client-side power management agent.

15. The computing device of claim 9, wherein an Advanced Configuration and Power Interface (ACPI) mechanism associated with the VM provides an indication to the VM power management module that the VM is inactive.

16. A non-transitory machine-readable storage medium including data that, when accessed by a processing device, cause the processing device to perform operations comprising:
executing, by a hypervisor executed by the processing device of a host computer system, a plurality of VM power management modules each dedicated to a virtual machine (VM) of a plurality of VMs hosted by the host computer system, wherein each VM power management module of the plurality of VM power management modules is executed external to its associated VM by the hypervisor;
for each VM of the plurality of VMs:
monitoring, by the VM power management module associated with the VM, the VM to detect user activity associated with the VM;
identifying, by the VM power management module associated with the VM, when the VM is inactive based on the user activity associated with the VM; and
when the VM is identified as inactive, notifying, by the VM power management module, a power management system of the host computer system of the inactivity of the VM;
wherein the power management system applies, in response to receiving a notification of inactivity of one of the plurality of VMs, a power reduction policy to the VM identified as inactive.

17. The non-transitory machine-readable storage medium of claim 16, wherein the power reduction policy comprises at least one of a screen saver, priority reduction, swapping the VM with another VM, hibernation, suspension, standby, or shut off.

18. The non-transitory machine-readable storage medium of claim 16, wherein a client-side power management agent works in tandem with the VM power management system of the host computer system to apply the power reduction policy to the VM, the client-side power management agent located on a client that displays a desktop of the VM to an end user of the VM.

19. The non-transitory machine-readable storage medium of claim 18, wherein the machine-readable storage medium includes data that, when accessed by a machine, cause the machine to perform operations further comprising passing control of the power reduction policy for the VM to the client-side power management agent.

20. The non-transitory machine-readable storage medium of claim 16, wherein an Advanced Configuration and Power Interface (ACPI) mechanism associated with the VM provides an indication to the VM power management module that the VM is inactive.

\* \* \* \* \*